US011284241B2

(12) United States Patent
Xu et al.

(10) Patent No.: US 11,284,241 B2
(45) Date of Patent: Mar. 22, 2022

(54) METHOD AND APPARATUS FOR PERFORMING CELL SPECIFICATION PROCEDURE FOR NETWORK SLICE-BASED NR IN WIRELESS COMMUNICATION SYSTEM

(71) Applicant: LG Electronics Inc., Seoul (KR)

(72) Inventors: Jian Xu, Seoul (KR); Seokjung Kim, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/892,844

(22) Filed: Jun. 4, 2020

(65) Prior Publication Data

US 2020/0304982 A1 Sep. 24, 2020

Related U.S. Application Data

(63) Continuation of application No. 16/064,943, filed as application No. PCT/KR2017/008143 on Jul. 28, 2017, now Pat. No. 10,708,757.

(Continued)

(51) Int. Cl.
*H04W 8/08* (2009.01)
*H04W 36/00* (2009.01)
(Continued)

(52) U.S. Cl.
CPC ......... *H04W 8/08* (2013.01); *H04W 36/0016* (2013.01); *H04W 48/10* (2013.01);
(Continued)

(58) Field of Classification Search
CPC .............. H04L 41/042; H04L 41/0896; H04L 41/5051; H04L 41/5096; H04W 16/18;
(Continued)

(56) References Cited

U.S. PATENT DOCUMENTS

2002/0126656 A1 9/2002 Park
2015/0124708 A1 5/2015 Blankenship et al.
(Continued)

FOREIGN PATENT DOCUMENTS

CN 105813195 A 7/2016
EP 3379867 A1 9/2018
(Continued)

OTHER PUBLICATIONS

S2-162622: SA WG2 Temporary Document; SA WG2 Meeting #115, May 23-27, 2016, Nanjing, P.R. China, Samsung, "Solution for Network Slice Selection based on the NG UE's service context," pp. 1-4.

(Continued)

*Primary Examiner* — Pao Sinkantarakorn
(74) *Attorney, Agent, or Firm* — Dentons US LLP

(57) ABSTRACT

A new cell specification procedure can be defined, in order to support more efficiently a network slice function in a new radio (NR) access technology as being a part of a 5G communication system. From a perspective of a radio access network (RAN)-core network (CN) interface, a RAN node can transmit, to a CN node, a first indicator related to the slice support of the RAN node, and receive, from the CN node, a second indicator related to the slice support of the CN node.

15 Claims, 10 Drawing Sheets

Related U.S. Application Data

(60) Provisional application No. 62/368,180, filed on Jul. 29, 2016.

(51) Int. Cl.
| | | |
|---|---|---|
| *H04W 48/10* | (2009.01) | |
| *H04W 48/16* | (2009.01) | |
| *H04W 60/00* | (2009.01) | |
| *H04W 92/04* | (2009.01) | |

(52) U.S. Cl.
CPC ........... *H04W 48/16* (2013.01); *H04W 60/00* (2013.01); *H04W 60/005* (2013.01); *H04W 92/045* (2013.01)

(58) Field of Classification Search
CPC ..... H04W 48/18; H04W 48/20; H04W 60/00; H04W 88/08; H04W 88/12; H04W 88/14; H04W 92/045; H04W 92/10–14
See application file for complete search history.

(56) References Cited

U.S. PATENT DOCUMENTS

| | | | |
|---|---|---|---|
| 2015/0223129 A1 | 8/2015 | Liang et al. | |
| 2016/0135057 A1 | 5/2016 | Wang et al. | |
| 2017/0070892 A1 | 3/2017 | Song | H04L 41/042 |
| 2018/0014339 A1 | 1/2018 | Baek | H04W 76/10 |
| 2018/0352501 A1* | 12/2018 | Zhang | H04W 48/18 |
| 2019/0159027 A1* | 5/2019 | Kuge | H04W 60/00 |
| 2019/0159117 A1* | 5/2019 | Kuge | H04W 48/18 |
| 2019/0159119 A1 | 5/2019 | Djordjevic | H04W 8/18 |
| 2019/0174321 A1* | 6/2019 | Sun | H04W 48/18 |

FOREIGN PATENT DOCUMENTS

| | | |
|---|---|---|
| KR | 1020160068840 A | 6/2016 |
| WO | 2017175715 A1 | 10/2017 |

OTHER PUBLICATIONS

3GPP TR 38.801 V0.1.0: 3rd Generation Partnership Project; Technical Specification Group Radio Access Network; Study on New Radio Access Technology; Radio Access Architecture and Interfaces (Apr. 2016), pp. 1-17.

S2-164116: SA WG2 Temporary Document, SA WG2 Meeting #116, Jul. 11-15, 2016, Vienna, Austria, Nokia, ETRI, Samsung, KDDI, KPN, Interdigital, Oracle, CATT, ZTE, Qualcomm Incorporated, "Merged Proposal for Network Slice Selection," pp. 1-12.

S2-163978: SA WG2 Temporary Document, SA WG2 Meeting #116, Jul. 11-15, 2016, Vienna, AT, Ericsson, "Solution for selection of a network slice instance," pp. 1-5.

R2-164123: 3GPP TSG-RAN WG2 Meeting #94, Nanjing, China, May 23-27, 2016, Qualcomm Incorporated, Convida Wireless, "RAN-CN functional split analysis," pp. 1-8.

R3-161107: 3GPP TSG RAN WG3 Meeting #92, Nanjing, China, May 23-27, 2016, ZTE, "Network Slice Selection Procedure," pp. 1-4.

ZTE, "Network Slice Selection Procedure", R3-161107, 3GPP TSG RAN WG3 Meeting #92, Nanhing, China, May 13, 2016. See section 5; and figure x.

Hattachi, Rachid Ei et al., NGMN 5G White Paper, 5G White Paper, Mar. 2015, (https://www.ngmn.org/5g-white/5g-white-paper.html). See pp. 46-48; and figure 9.

Huawei, "Network Slice Selection", R3-161134, RAN WG3 Meeting #92, Nanjing, China, May 14, 2016. See section 8.

"3rd Generation Partnership Project; Technical Specification Group Services and System Aspects; Study on Architecture for Next Generation System (Release 14)", 3GPP TR 23.799 V0.6.0 (Jul. 2016).

\* cited by examiner

METHOD AND APPARATUS FOR PERFORMING CELL SPECIFICATION PROCEDURE FOR NETWORK SLICE-BASED NR IN WIRELESS COMMUNICATION SYSTEM

This application is a continuation application of U.S. patent application Ser. No. 16/064,943 filed on Sep. 5, 2019, which is a National State Entry of International Application No. PCT/KR2017/008143 filed on Jul. 28, 2017, and claims priority to U.S. Provisional Application No. 62/368,180 filed on Jul. 29, 2016, all of which are hereby incorporated by reference in their entireties as if fully set forth herein.

BACKGROUND OF THE INVENTION

Field of the Invention

The present invention relates to wireless communications, and more particularly, a method and apparatus for performing a cell-specific procedure for a network slice-based new radio access technology (NR) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. The NR system may be called another name, e.g. new radio access technology (new RAT). 3GPP has to identify and develop the technology components needed for successfully standardizing the NR timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Initial work for NR should allocate high priority on gaining a common understanding on what is required in terms of radio protocol structure and architecture, with focus on progressing in radio interface protocol architecture and procedures and radio access network architecture, interface protocols and procedures. This work shall cover at least the followings:

Study the feasibility of different options of splitting the architecture into a "central unit (CU)" and a "distributed unit (DU)", with potential interface in between, including transport, configuration and other required functional interactions between these nodes;

Study the alternative solutions with regard to signaling, orchestration . . . and operations, administration and maintenance (OAM), where applicable;

Study and outline the radio access network (RAN)-core network (CN) interface and functional split;

Study and identify the basic structure and operation of realization of RAN networks functions (NFs); Study to what extent it is feasible to standardize RAN NFs, the interfaces of RAN NFs and their interdependency;

Study and identify specification impacts of enabling the realization of network slicing;

Study and identify additional architecture requirements, e.g. support for quality of services (QoS) concept, self-organization network (SON), support of sidelink for device-to-device (D2D).

In the above listed items, features of network slicing should be supported in detail.

SUMMARY OF THE INVENTION

The present invention provides a method and apparatus for performing a cell-specific procedure for a network slice-based new radio access technology (NR) in a wireless communication system. The present invention provides a method and apparatus in which a radio access network (RAN) node and core network (CN) node of the network slice-based NR mutually transmit indications regarding slice support in a cell-specific procedure.

In an aspect, a method for performing a radio access network (RAN)-core network (CN) interface setup procedure by a RAN node in a wireless communication system is provided. The method includes transmitting a first indication related to slice support of the RAN node to a CN node, and receiving a second indication related to slice support of the CN node from the CN node.

The first indication may be transmitted via a RAN-CN interface setup request message, and the second indication may be received via a RAN-CN interface setup response message. The RAN-CN interface setup request message may be any one of an NG1 setup request message or an NG setup request message, and the RAN-CN interface setup response message may be any one of an NG1 setup response message or an NG setup response message. The RAN-CN interface setup request message may include an identifier (ID) of the RAN node. The ID of the RAN node may be a global gNodeB (gNB) ID or a next-generation eNB (ng-eNB) ID.

The RAN node may be a gNB or an ng-eNB. The CN node may be a node supporting a default or dedicated common control plane function (C-CPF) or a node supporting access and mobility management function (AMF). The first indication or the second indication may correspond to any one of a "user equipment (UE) Usage Type", a "dedicated core network ID (DCN-ID)", a "Service Type", a "domain network name (DNN)", a "multi-dimensional descriptor (MDD)", a "Tenant ID" or a "Service Descriptor/Slice type".

The method may further include performing slice selection for a UE. The CN node may perform a registration area management for a UE.

In another aspect, a method for performing a radio access network (RAN)-core network (CN) interface configuration update procedure by a CN node in a wireless communication system is provided. The method includes transmitting a first indication related to slice support of the CN node to a RAN node, and receiving a second indication related to slice support of the RAN node from the RAN node.

The first indication may be transmitted via an access and mobility management function (AMF)/next generation (NG)-RAN configuration update message.

The second indication may be received via a gNodeB (gNB)/NG-RAN configuration update message. The gNB/NG-RAN configuration update message may include a global gNB identifier (ID) or a next-generation eNB (ng-eNB) ID.

A RAN node and CN node of the network slice-based NR can mutually transmit indications regarding slice support in a cell-specific procedure efficiently.

DESCRIPTION OF EXEMPLARY EMBODIMENTS

Figure 1:
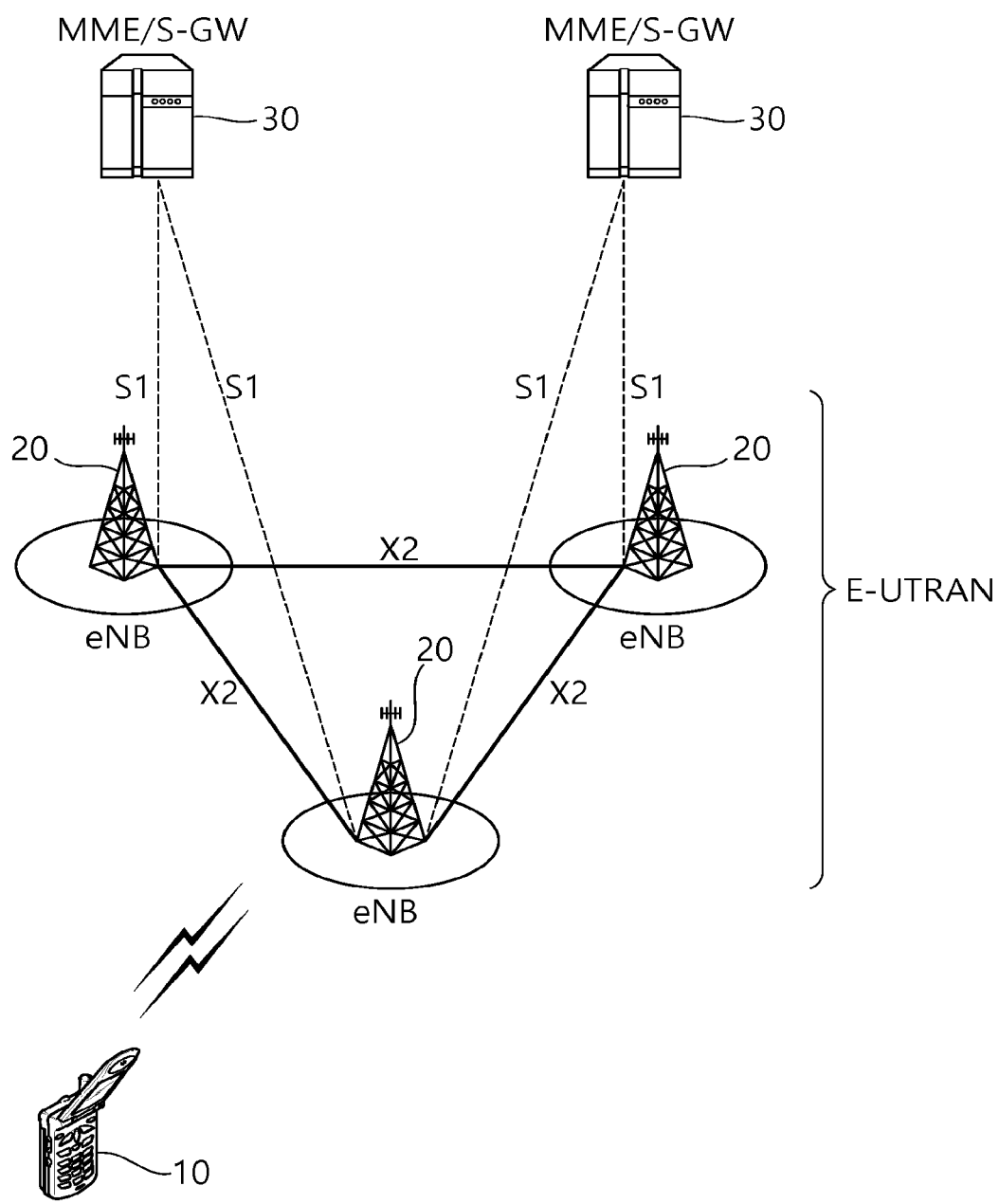
FIG. 1 shows 3GPP LTE system architecture.

FIG. 1 shows 3GPP LTE system architecture. Referring to FIG. 1, the 3GPP LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an Si interface.

5G system is a 3GPP system consisting of 5G access network (AN), 5G core network (CN) and UE. 5G access network is an access network comprising a next generation radio access network (NG-RAN) and/or non-3GPP access network connecting to a 5G core network. NG-RAN is a radio access network that supports one or more of the following options with the common characteristics that it connects to 5G core network:

1) Standalone new radio (NR).
2) NR is the anchor with E-UTRA extensions.
3) Standalone E-UTRA.
4) E-UTRA is the anchor with NR extensions.

As described above, the NR may be included in 5G system. The NR may be called another name, e.g. new radio access technology (new RAT). The NR may be other system than LTE system, and may be used for specific usage, including enhanced mobile broadband (eMBB), massive machine-type-communications (mMTC), ultra-reliable and low latency communications (URLLC), etc.

Network slicing, which is one feature of the NR, is described. It may be referred to as Section 6.1.3 and Annex B of 3GPP TR 23.799 V0.6.0 (2016-07). A network slice is a logical network that provides specific network capabilities and network characteristics. Network slicing enables the operator to create networks customized to provide optimized solutions for different market scenarios which demands diverse requirements, e.g. in the areas of functionality, performance and isolation.

The network slice is implemented via network slice instance(s) (NSI(s)). The network slice instance is a set of network function instances and the required resources (e.g. compute, storage and networking resources) which form a deployed network slice. The network slice instance may be fully or partly, logically and/or physically, isolated from another network slice instance. The resources comprises of physical and logical resources. The network slice instance may be composed of sub-network Instances, which as a special case may be shared by multiple network slice instances. The network slice instance is defined by a network slice blueprint. Instance-specific policies and configurations are required when creating a network slice instance. Network characteristics examples are ultra-low-latency, ultra-reliability, etc.

A network function (NF) is a 3GPP adopted or 3GPP defined processing function in a network, which has defined functional behavior and 3GPP defined interfaces. The network function can be implemented either as a network element on a dedicated hardware, as a software instance running on a dedicated hardware, or as a virtualized function instantiated on an appropriate platform, e.g. on a cloud infrastructure. A NF service is a functionality exposed by a NF through a service based interface and consumed by other authorized NFs. A NF service operation is elementary unit a NF service is composed of.

As one solution for network slicing, to enable a UE to simultaneously obtain services from multiple network slices of one network operator, multiple connections to multiple network slices may be supported.

Figure 2:
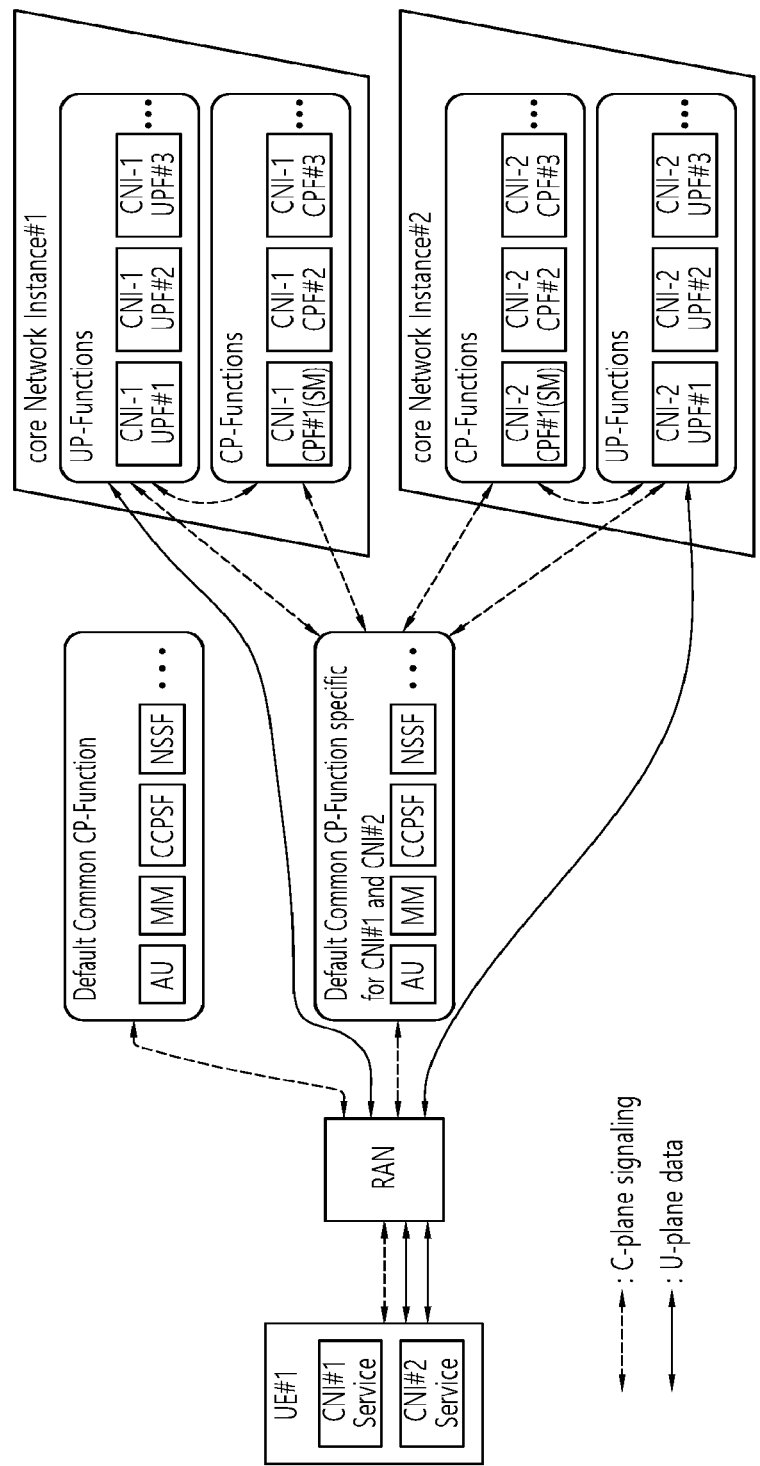
FIG. 2 shows an example of sharing a set of common C-Plane functions among multiples core network instances.

FIG. 2 shows an example of sharing a set of common C-Plane functions among multiples core network instances. Referring to FIG. 2, a single set of control plane (C-Plane) functions that are in common among core network instances is shared across multiple core network instances. Further, other C-Plane functions that are not in common reside in their respective core network instances, and are not shared with other core network instances.

Common C-Plane functions (C-CPF) to multiple core network instances can be:

Authentication function (AU): AU is responsible for authenticating and authorizing the UE to attach to the operator's network. It also provides security and integrity protection of NAS signaling.

Mobility management function (MM): MM is responsible for UE registration in the operator's network (e.g. storing of UE context) and UE mobility support (e.g. providing mobility function when UE is moving across base stations within the operator's network).

The C-CPF may be called other names, e.g. access and mobility management function (AMF).

Dedicated C-Plane functions for each core network instances can be:

Session management function (SM): SM is responsible for protocol data unit (PDU) session establishment, PDU session modification and PDU session termination.

The direct C-Plane interface between RAN and C-Plane functions of core network instance is not needed, since the encrypted NAS signaling message has to be decrypted by a C-CPF, which has exchanged the encrypted key with the UE, for example, the AU function. In case of UE accessing a single core network instance, RAN can have a direct C-Plane interface to the specific C-Plane function located within the core network instance. In such case, those C-Plane functions depicted as a part of C-CPF are considered to be C-Plane functions resided within the core network instance, and hence, there is no C-CPF.

The principles of the solution depicted in FIG. 2 are described as follows:

A core network instance consists of a single set of C-Plane functions and a single set of U-Plane functions.

A core network instance is dedicated for the UEs that are belonging to the same UE type. Identifying the UE type is done by using a specific parameter, e.g. the UE Usage Type, and/or an information from the UE's subscription.

A set of C-Plane functions is responsible, for example, for supporting UE mobility if demanded or for admitting the UE into the network by performing authentication and subscription verification.

All C-Plane functions that are common to multiple core network instances, are not necessary to be created multiple times.

Other C-Plane functions that are not in common with other core network instances are only used by its own core network instance.

A set of U-Plane functions in a core network instance is responsible for providing a specific service to the UE and for transports the U-Plane data of the specific service. For example, one set of U-Plane functions in core network instance #1 provides an eMBB service to the UE, whereas another set of U-Plane functions in core network instance #2 provides a critical communication service to the UE.

Each UE can have multiple U-Plane connections to different sets of U-Plane function that are available at different core network Instances simultaneously.

The network slice selection function (NSSF) is responsible for selecting which core network instance to accommodate the UE by taking into account the UE's subscription and the specific parameter, e.g. the UE type, the Service Type or domain network name (DNN) that can be mapped to represent the Service Type that the core network instance supports.

The RAN communicates with the C-CPF via a single C-Plane interface regardless of which C-Plane function within the C-CPF that the RAN is communicating with. Hence, a C-CPF is considered as a black box.

The common C-Plane selection function (CCPSF) is considered to be a part of C-CPF, i.e. the CCPSF is assumed to be located in the C-CPF. The CCPSF is responsible for determining which C-CPF that the base station should communicate with. Determination of C-CPF is done by checking with the UE's subscription profile. The CCPSF is not a function to route the NAS signaling message to the right C-CPF. In this solution, it is assumed that the RAN has a function to route the NAS signaling message to a proper C-CPF by taking the information that is sent by the CCPSF in case of the first initial connection request or by the UE in case of any subsequent NAS messages.

Meanwhile, in this solution, the "UE Usage Type", "DCN-ID", "Service Type" and "DNN" are used for the purposes as described below:

"UE Usage Type" is used for identifying the type of UE, e.g. Car UE Usage Type, Smartphone UE Usage Type.

"DCN-ID" is used for identifying a dedicate core network that is specific for each UE Usage Type. In addition, an operator may consider to use the DCN-ID to identify specific a dedicate core network for the enterprise of the same UE Usage Type or even for the different variants of dedicated core network. An example for the latter case could be to have different variants of dedicate core network for cellular internet-of-things (CIoT) UEs, i.e. supporting different CioT optimization features. In other words, DCN-ID is used to determine which C-CPF that is specific for this UE Usage Type and (optionally) for a specific UE enterprise of this UE Usage Type. For instance, one could think of having a dedicate core network for different car enterprises, although they belong to the same type of UE.

"Service Type" is used for identifying what type of service that the core network instance is supposed to support, e.g. the car UE may want to access multiple core network instances simultaneously that supports eMBB service and vehicle-to-everything (V2X) service.

"Domain Network Name (DNN)" is used for identifying the PDN that a UE wants to communicate with for a certain service type, e.g. DNN #1 for Internet service that requires mobile broadband service.

Temporary UE identity is a temporary identifier provided by the core network to the UE. This is similar to globally unique temporary identifier (GUTI) in evolved packet system (EPS) case. This temporary UE identity consists of two parts: 1) identifier of C-CPF, 2) UE specific identifier.

Taking the above explanation into account, selecting a proper core network instance for the service type that is requested by the UE can be done by using the DNN parameter.

Figure 3:
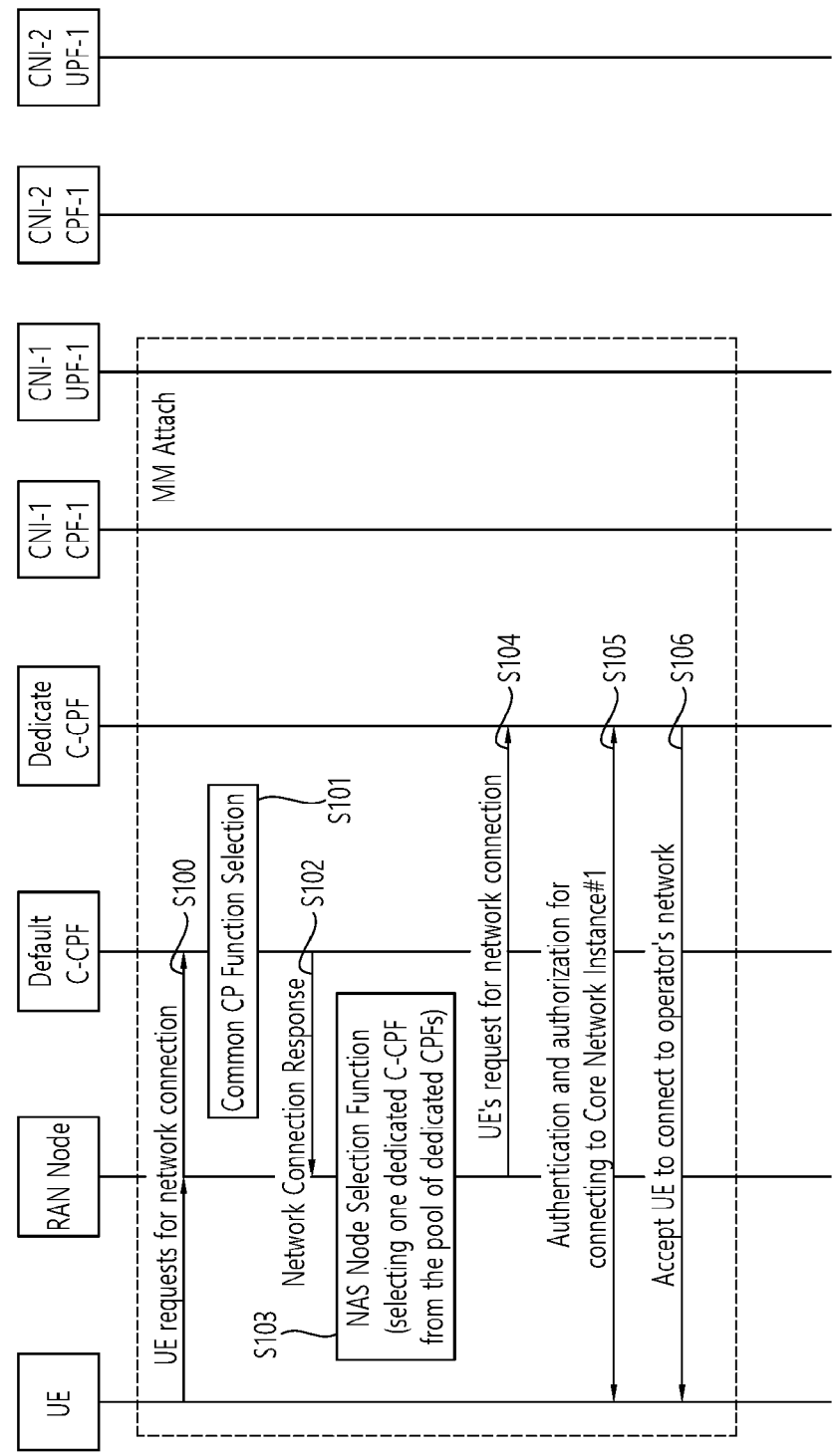
FIG. 3 is a first part of signaling flow for supporting connections with multiple core network instances.

FIG. 3 is a first part of signaling flow for supporting connections with multiple core network instances. FIG. 3 shows an MM attach procedure for supporting connections with multiple core network instances.

In step S100, when a UE first connects to the operator's network or registers to the public land mobile network (PLMN) for the first time and there is no sufficient information for the RAN to route this network connection request to an appropriate C-CPF, the UE sends a network connection request to the RAN, which is then further forwarded to the default C-CPF. The flow continues in step S101, which will be described below.

If the UE provides the DCN-ID along with this network connection request, but does not provide a Temporary UE identity, the RAN uses this DCN-ID to determine an appropriate C-CPF that supports this DCN-ID, and the flow continues in step S103, which will be described below. In addition, the UE may provide other information, e.g. Service Type and/or DNN along with this network connection request.

If the UE provides the Temporary UE identity, the RAN uses the Temporary UE identity to determine a dedicate C-CPF and, the flow continues in step S103, which will be described below. In addition, the UE may provide other information, e.g. DCN-ID, Service Type and/or DNN along with this network connection request.

When the UE sends a request to connect to an operator's network, a UE may request to establish a session for a particular service by sending the DNN along with this network connection request. If this is the case, after the authentication and authorization in step S105, which will be described below, has been performed, the dedicate c-CPF will establish the session for the request service like similar to steps S111, S112 and S113, which will be described below in FIG. 4.

In step S101, the CCPSF located in the default C-CPF determines which C-CPF to be connected to by taking into account information in the network connection request from a UE in step S100, e.g. DCN-ID. In addition, other information from the subscription database may be also considered. For example, the UE's subscription may indicate that for this UE, the operator should set up a session with the subscribed core network instance. In FIG. 3, this is the core network instance #1.

In case, the default C-CPF determines that it will serve this UE's network connection request, it either continues with the authentication and admitting the UE to attach/connect to operator's network or reject this UE's network connection request and hence this procedure ends in this step. This specific case is not depicted in FIG. 3 for simplicity of the signaling flow.

In step S102, the default C-CPF sends a response to the RAN node with the C-CPF for the UE to attach. Same content of UE's network connection request in step S100 is also sent back to the RAN.

If the UE provides a Temporary UE identity, this means that the UE has been once registered at the PLMN, and the core network has decided to which DCN-ID the UE should be connected. Hence, the RAN uses only the Temporary UE identity to route the NAS message to the appropriate C-CPF.

In step S103, in case there is a pool of C-CPFs that are dedicated for this UE Usage Type and/or for this DCN-ID provided by the UE or by the default C-CPF in step S102, the RAN node performs NAS node selection function (NNSF).

In step S104, the RAN node routes the UE's network connection request to the dedicate C-CPF. Along with this request, it may contain other information like the DNN to enable the dedicate C-CPF to select a core network instance that is specific for a certain Service Type.

In step S105, authentication and admitting the UE to attach/connect to operator's network is performed. In this step, the key for decrypting NAS message between the UE and the dedicate C-CPF is also provided.

In step S106, the dedicated C-CPF sends a network connection accept response to the UE. In this response, it contains the Temporary UE identity and the information, for which the UE is to be configured, e.g. which DCN-ID, its corresponding Service Type and/or corresponding DNN that the UE is allowed to connect. In case, the DCN-ID newly provided does not match to the ones that the UE already has, the DCN-ID(s) will be configured at the UE.

Figure 4:
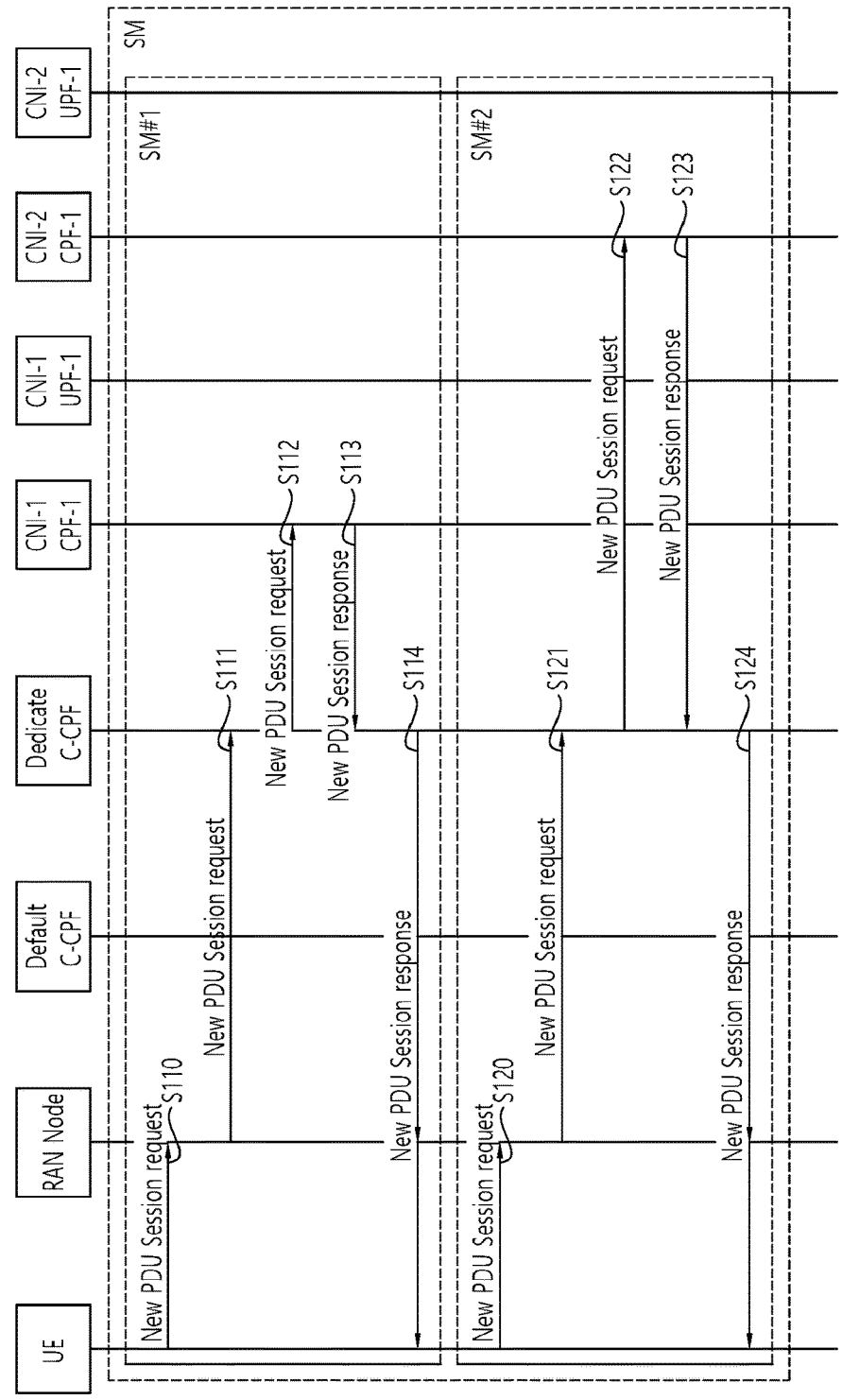
FIG. 4 is a second part of signaling flow for supporting connections with multiple core network instances.

FIG. 4 is a second part of signaling flow for supporting connections with multiple core network instances. The signaling flow of FIG. 4 follows the signaling flow of FIG. 3. FIG. 4 shows an SM procedure for supporting connections with multiple core network instances.

In step S110, the UE requests for establishment of a session for a communication service (e.g. service #1 that is provided by the core network instance #1) by sending an SM request for a new PDU session. In this PDU session request, the UE provides the DCN-ID and DNN.

In step S111, the RAN forwards the PDU session request to an appropriate dedicated C-CPF by using the DCN-ID information sent by the UE.

In step S112, the dedicated C-CPF selects CPF of the core network instance #1 by using the DNN information in the PDU session request, and forwards the UE's PDU session request for the service #1 to the CPF-1 in core network instance #1 (i.e. CNI-1 CPF-1), which is responsible for session management in CNI #1. This forwarded PDU session request still contains the information that has been sent by the UE such as the UE Usage Type, DCN-ID and DNN.

In step S113, after a successful session establishment, the CPF-1 in core network instance #1 sends the session response back to the dedicated C-CPE In step s114, the dedicated C-CPF sends a new service response back to the UE via the RAN.

In step S120, the UE requests for establishment another session for a new communication service that is of a different service type than the previous service. In this PDU session request, the UE provides the Temporary UE identity, UE Usage Type, DCN-ID, and Service Type and/or DNN.

In step S121, the RAN determines the dedicate C-CPF by using the Temporary UE identity sent by the UE and forwards the PDU session request to the dedicated C-CPF.

In step S122, the dedicated C-CPF selects CPF of the core network instance #2 by using the DNN information in the PDU session request, and forwards the UE's service request for the new service to the CPF-1 in core network instance #2 (i.e. CNI-2 CPF-1), which is responsible for session management in CNI #2. This forwarded PDU session request still contains the information that has been sent by the UE such as the UE Usage Type, DCN-ID, and Service Type and/or DNN.

In step S123, after a successful session establishment, the CPF-1 in core network instance #2 sends the session response back to the dedicated C-CPF.

In step S124, the dedicated C-CPF sends a new service response back to the UE via the RAN.

Meanwhile, for other similar candidate architecture, a multi-dimensional descriptor (MDD) may be additionally defined. The MDD may identify a slice. The MDD may be provided by the UE in both the RRC and the NAS signaling layers. For each slice the UE can access, the MDD may consist of at least a tenant ID which identifies a tenant, and a service descriptor/slice type which identifies the network behaviors. The tenant ID is used by an operator to lease a portion of its network infrastructure to a specific vendor. The service descriptor/slice type may correspond to e.g. eMBB service, critical communication, mMTC or other behaviors.

In order to support a UE-based slice selection procedure, it is necessary to define a cell-specific configuration procedure in NR. However, a cell-specific configuration procedure has not yet been clearly defined in NR.

In order to solve the aforementioned problem, the present invention provides a method of performing a cell-specific procedure for NR. The present invention is focused on a cell-specific procedure for better supporting a UE-based slice selection procedure. Specifically, the present invention solves the above problem from a viewpoint of the RAN-CN interface.

Figure 5:
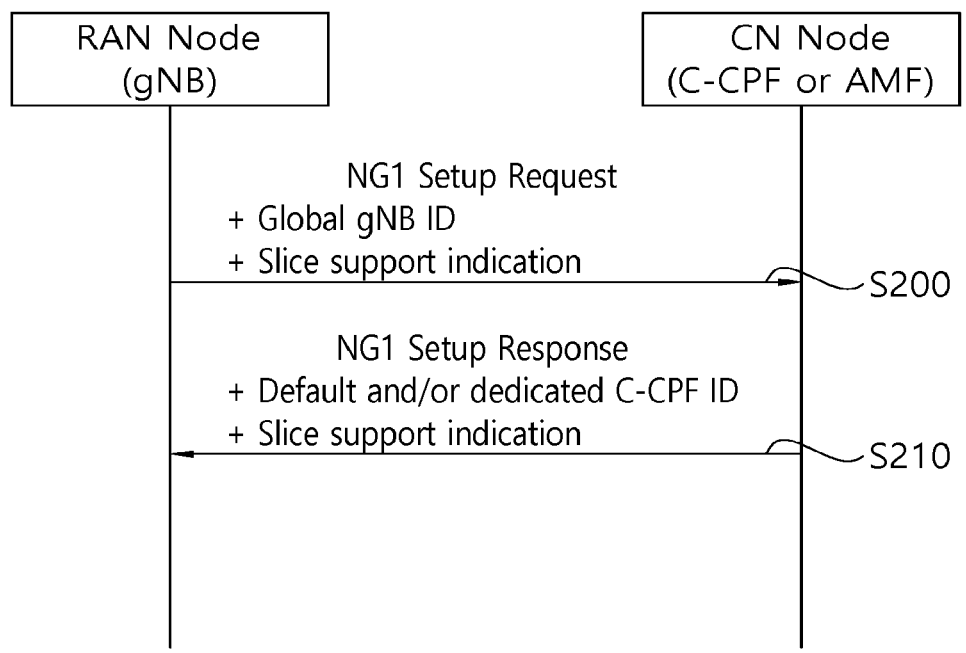
FIG. 5 shows a method of performing a RAN-CN interface setup procedure according to an embodiment of the present invention.

FIG. 5 shows a method of performing a RAN-CN interface setup procedure according to an embodiment of the present invention. An object of the RAN-CN interface setup procedure is to exchange application level data necessary for a RAN node and a CN node to accurately interact with each other on a RAN-CN control interface. In this embodiment, the RAN-CN interface is setup between the RAN node and the CN node. The RAN node may be a gNodeB (gNB) or a next generation eNB (ng-eNB). The CN node may be a node supporting a default/dedicated C-CPF or AMF. The RAN-CN interface may be an NG1 interface or NG interface.

At step S200, the RAN node transmits a RAN-CN interface setup request message to the CN node. The RAN-CN interface setup request message is transmitted by the RAN node in order to transmit application layer information about a RAN-CN control interface instance. The RAN-CN interface setup request message may include at least one of a global gNB ID (or ng-eNB ID) or slice support indication of the RAN node.

Table 1 shows an example of the RAN-CN interface setup request message according to an embodiment of the present invention.

TABLE 1

| IE/Group Name | Presence | Range | IE type and reference | Semantics description | Criticality | Assigned Criticality |
|---|---|---|---|---|---|---|
| Message Type | M | | <ref> | | YES | reject |
| Global gNB ID | M | | <ref> | | YES | reject |
| gNB Name | O | | PrintableString (SIZE(1 . . . 150, . . .)) | FFS | YES | ignore |
| Supported TAs | | 1 . . . <maxnoofTACs> | | Supported TAs in the gNB. | GLOBAL | reject |
| >TAC | M | | <ref> | Broadcast TAC | — | |
| >Broadcast PLMNs | | 1 . . . <maxnoofBPLMNs> | | Broadcast PLMNs | — | |
| >>PLMN Identity | M | | <ref> | | | |
| >>TAI Slice Support | O | FFS | | The structure of this IE is FFS. | YES | ignore |
| Default Paging DRX | M | | <ref> | | YES | ignore |

Referring to Table 1, the RAN-CN interface setup request message may include a "Global gNB ID" information element (IE). Furthermore, the RAN-CN interface setup request message may include a "TAI Slice Support" IE corresponding to slice support indication of the RAN node. In the case where the "TAI Slice Support" IE is included in the RAN-CN interface setup request message, if supported, a CN node is may store a received value and may use the stored value for the registration area management of a UE.

In the present embodiment, the RAN-CN interface setup request message has been assumed to be an NG1 setup request message, but the present invention is not limited thereto. The RAN-CN interface setup request message may be a different message (e.g. an NG setup request message).

At step S210, the CN node transmits a RAN-CN interface setup response message to the RAN node. The RAN-CN interface setup response message is transmitted by the CN node in order to transmit application layer information about a RAN-CN control interface instance. The RAN-CN interface setup response message may include clear information about a C-Plane function/node. The information about the C-Plane function/node may include a default/dedicated C-CPF ID. For example, the default/dedicated C-CPF ID may correspond to at least one of a "UE Usage Type", a "DCN-ID", a "Service Type", a "DNN", an "MDD", a "Tenant ID" and a "Service Descriptor/Slice type". Furthermore, the RAN-CN interface setup response message may include slice support indication of the CN node.

Table 2 shows an example of the RAN-CN interface setup response message according to an embodiment of the present invention.

TABLE 2

| IE/Group Name | Presence | Range | IE type and reference | Semantics description | Criticality | Assigned Criticality |
|---|---|---|---|---|---|---|
| Message Type | M | | <ref> | | YES | reject |
| AMF Name | O | | PrintableString (SIZE(1 . . . 150, . . .)) | FFS | YES | ignore |
| AMF pool and AMF code related information | M | | <ref> | | GLOBAL | reject |
| Relative AMF Capacity | M | | <ref> | | YES | ignore |
| AMF Slice Support | O | FFS | | Configured slices in the AMF. The structure of this IE is FFS. | YES | ignore |
| Criticality Diagnostics | O | | <ref> | | YES | ignore |

Referring to Table 2, the RAN-CN interface setup response message may include an "AMF Slice Support" IE corresponding to slice support indication of the CN node. In the case where the "AMF Slice Support" IE is included in the RAN-CN interface setup response message, if supported, a RAN node may store a received value and may use the stored value for additional network slice selection and CN node selection.

In the present embodiment, the RAN-CN interface setup response message has been assumed to be an NG1 setup response message, but the present invention is not limited thereto. The RAN-CN interface setup response message may be a different message (e.g. an NG setup response message).

The RAN node that has received the RAN-CN interface setup response message from the CN node may take a proper action based on the information (e.g. a "UE Usage Type", a "DCN-ID", a "Service Type", a "DNN", an "MDD", a "Tenant ID" or a "Service Descriptor/Slice type") included in the received RAN-CN interface setup response message. For example, the RAN node may perform slice selection or NNSF selection for a UE during one of an MM access procedure, a service request procedure, a tracking area update (TAU) procedure and a handover mobility procedure.

Figure 6:
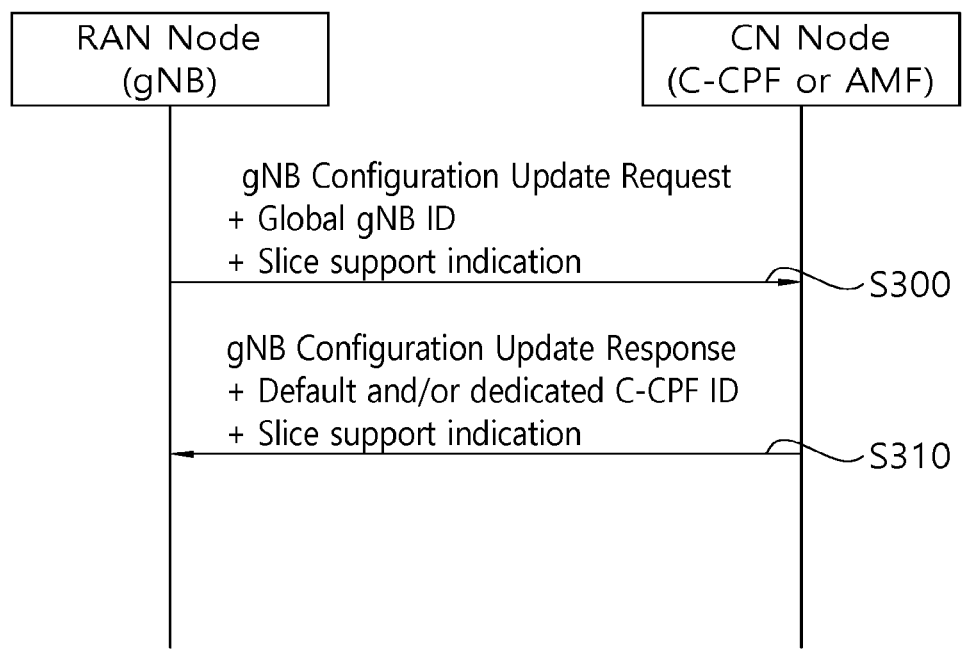
FIG. 6 shows a method of performing a RAN-CN interface configuration update procedure according to an embodiment of the present invention.

FIG. 6 shows a method of performing a RAN-CN interface configuration update procedure according to an embodiment of the present invention. An object of the RAN-CN interface configuration update procedure is to update application level data necessary for a RAN node and a CN node to accurately interact with each other on a RAN-CN control interface. In this embodiment, the configuration of the RAN-CN interface is updated between the RAN node and the CN node. In this embodiment, the RAN-CN interface configuration update procedure is triggered by the RAN node. The RAN node may be a gNB or ng-eNB. The CN node may be a node supporting a default/dedicated C-CPF or AMF. The RAN-CN interface may be an NG1 interface or NG interface.

At step S300, the RAN node transmits a RAN-CN interface configuration update request message to the CN node. The RAN-CN interface configuration update request message is transmitted by the RAN node in order to transmit updated application layer information about a RAN-CN control interface instance. The RAN-CN interface configuration update request message may include at least one of a global gNB ID (or ng-eNB ID) or slice support indication of the RAN node.

Table 3 shows an example of the RAN-CN interface configuration update request message according to an embodiment of the present invention.

TABLE 3

| IE/Group Name | Presence | Range | IE type and reference | Semantics description | Criticality | Assigned Criticality |
|---|---|---|---|---|---|---|
| Message Type | M | | <ref> | | YES | reject |
| Global gNB ID | M | | <ref> | | YES | reject |
| gNB Name | O | | PrintableString (SIZE(1 . . . 150, . . .)) | FFS | YES | ignore |

TABLE 3-continued

| IE/Group Name | Presence | Range | IE type and reference | Semantics description | Criticality | Assigned Criticality |
|---|---|---|---|---|---|---|
| Supported TAs | | 1 . . . <maxnoofTACs> | | Supported TAs in the gNB. | GLOBAL | reject |
| >TAC | M | | <ref> | Broadcast TAC | — | |
| >Broadcast PLMNs | | 1 . . . <maxnoofBPLMNs> | | Broadcast PLMNs | — | |
| >>PLMN Identity | M | | <ref> | | | |
| >>TAI Slice Support | O | | FFS | The structure of this IE is FFS. | YES | ignore |

Referring to Table 3, the RAN-CN interface configuration update request message may include a "Global gNB ID" IE. Furthermore, the RAN-CN interface configuration update request message may include a "TAI Slice Support" IE corresponding to the slice support indication of the RAN node. In the case where the "TAI Slice Support" IE is included in the RAN-CN interface configuration update request message, if supported, the CN node may store a received value and use the stored value for registration area management of a UE.

In the present embodiment, the RAN-CN interface configuration update request message has been assumed to be a gNB configuration update request message, but the present invention is not limited thereto. The RAN-CN interface configuration update request message may be a different message (e.g., a gNB/NG-RAN configuration update message).

At step S310, the CN node transmits a RAN-CN interface configuration update response message to the RAN node. The RAN-CN interface configuration update response message may include clear information about a C-Plane function/node. The information about the C-Plane function/node may include a default/dedicated C-CPF ID. For example, the default/dedicated C-CPF ID may correspond to at least one of a "UE Usage Type", a "DCN-ID", a "Service Type", a "DNN", an "MDD", a "Tenant ID" and a "Service Descriptor/Slice type". Furthermore, the RAN-CN interface configuration update response message may include slice support indication of the CN node.

In the present embodiment, the RAN-CN interface configuration update response message has been assumed to be a gNB configuration update response message, but the present invention is not limited thereto. The RAN-CN interface configuration update response message may be a different message (e.g., a gNB/NG-RAN configuration update confirm message).

The RAN node that has received the RAN-CN interface configuration update response message from the CN node may take a proper action based on the information (e.g. "UE Usage Type", "DCN-ID", "Service Type", "DNN", "MDD", "Tenant ID" or "Service Descriptor/Slice type") included in the received AN-CN interface configuration update response message. For example, the RAN node may perform slice selection or NNSF selection for a UE during one of an MM access procedure, a service request procedure, a TAU procedure and a handover mobility procedure.

Figure 7:
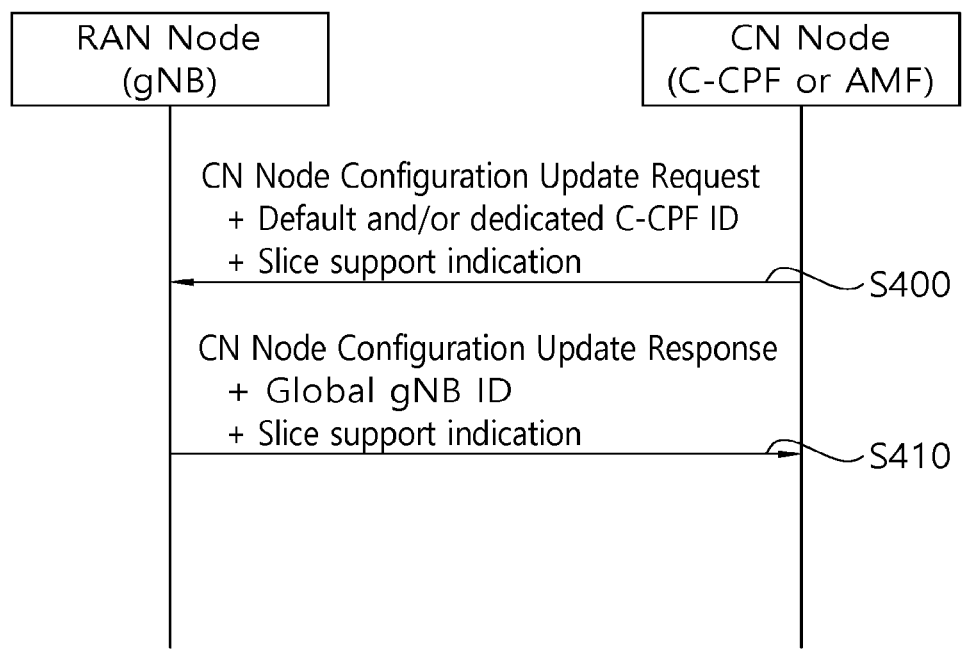
FIG. 7 shows a method of performing a RAN-CN interface configuration update procedure according to another embodiment of the present invention.

FIG. 7 shows a method of performing a RAN-CN interface configuration update procedure according to another embodiment of the present invention. An object of the RAN-CN interface configuration update procedure is to update application level data necessary for a RAN node and a CN node to accurately interact with each other on a RAN-CN control interface. In this embodiment, the configuration of the RAN-CN interface is updated between the RAN node and the CN node. In the embodiment, the RAN-CN interface configuration update procedure is triggered by the CN node. The RAN node may be a gNB or ng-eNB. The CN node may be a node supporting a default/dedicated C-CPF or AMF. The RAN-CN interface may be an NG1 interface or NG interface.

At step S400, the CN node transmits a RAN-CN interface configuration update request message to the RAN node. The RAN-CN interface configuration update request message is transmitted by the CN node in order to transmit updated information about the RAN-CN control interface instance. The RAN-CN interface configuration update request message may include clear information about a C-Plane function/node. The information about the C-Plane function/node may include a default/dedicated C-CPF ID. For example, the default/dedicated C-CPF ID may correspond to at least one of a "UE Usage Type", a "DCN-ID", a "Service Type", a "DNN", an "MDD", a "Tenant ID" and a "Service Descriptor/Slice type". Furthermore, the RAN-CN interface configuration update request message may include slice support indication of the CN node.

Table 4 shows an example of the RAN-CN interface configuration update request message according to embodiment of the present invention.

TABLE 4

| IE/Group Name | Presence | Range | IE type and reference | Semantics description | Criticality | Assigned Criticality |
|---|---|---|---|---|---|---|
| Message Type | M | | 9.2.1.1 | | YES | reject |
| AMF Name | O | | PrintableString (SIZE(1 . . . 150, . . .)) | | YES | ignore |

TABLE 4-continued

| IE/Group Name | Presence | Range | IE type and reference | Semantics description | Criticality | Assigned Criticality |
|---|---|---|---|---|---|---|
| AMF Slice Support | O | | FFS | Configured slices in the AMF. The structure of this IE is FFS. | YES | ignore |

Referring to Table 4, the RAN-CN interface configuration update request message may include an "AMF Slice Support" IE corresponding to slice support indication of the CN node. In the case where the "AMF Slice Support" IE is included in the RAN-CN interface configuration update response message, if supported, the RAN node may overwrite the entire list of supported CN node slices by a new list and use the received value for additional network slice selection and CN node selection.

In the present embodiment, the RAN-CN interface configuration update request message has been assumed to be a CN node configuration update request message, but the present invention is not limited thereto. The RAN-CN interface configuration update request message may be a different message (e.g., AMF/NG-RAN configuration update message).

The RAN node that has received the RAN-CN interface configuration update request message from the CN node may take a proper action based on the information (e.g. "UE Usage Type", "DCN-ID", "Service Type", "DNN", "MDD", "Tenant ID" or "Service Descriptor/Slice type") included in the received RAN-CN interface configuration update request message. For example, the RAN node may perform slice selection or NNSF selection for a UE during one of an MM access procedure, a service request procedure, a TAU procedure and a handover mobility procedure.

At step S410, the RAN node transmits a RAN-CN interface configuration update response message to the CN node. The RAN-CN interface configuration update response message may include at least one of a global gNB ID (or ng-eNB ID) or slice support indication of the RAN node.

In the present embodiment, the RAN-CN interface configuration update response message has been assumed to be a CN node configuration update response message, but the present invention is not limited thereto. The RAN-CN interface configuration update response message may be a different message (e.g., AMF/NG-RAN configuration update confirm message).

Figure 8:
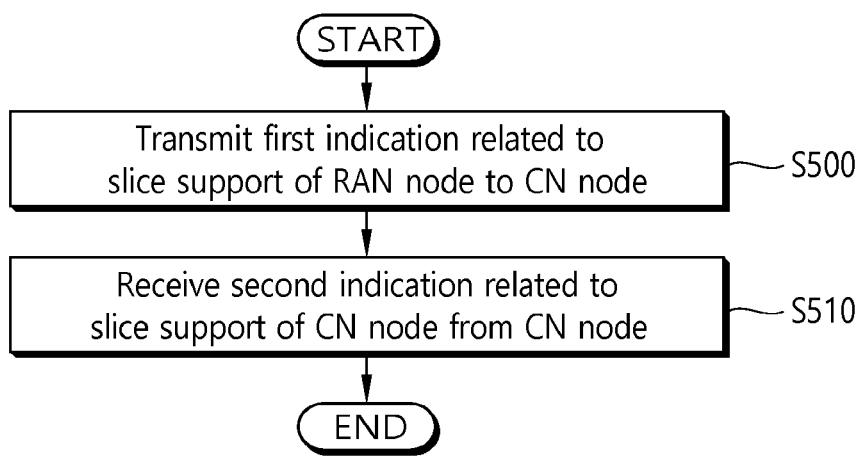
FIG. 8 shows a method for a RAN node to perform a RAN-CN interface setup procedure according to an embodiment of the present invention.

FIG. 8 shows a method for a RAN node to perform a RAN-CN interface setup procedure according to an embodiment of the present invention. This embodiment may correspond to the embodiment of FIG. 5.

At step S500, the RAN node transmits a first indication related to slice support of the RAN node to a CN node. The first indication may be transmitted through a RAN-CN interface setup request message. The RAN-CN interface setup request message may be any one of an NG1 setup request message and an NG setup request message. The RAN-CN interface setup request message may include the ID of the RAN node. The ID of the RAN node may be a global a gNB ID or ng-eNB ID.

At step S510, the RAN node receives a second indication related to slice support of the CN node from the CN node. The second indication may be received through a RAN-CN interface setup response message. The RAN-CN interface setup response message may be any one of an NG1 setup response message and an NG setup response message.

The first indication or the second indication may correspond to one of a "UE Usage Type", a "DCN-ID", a "Service Type", a "DNN", an "MDD", a "Tenant ID" and a "Service Descriptor/Slice type". The RAN node may be a gNB or ng-eNB. The CN node may be a node supporting a default or dedicated C-CPF or a node supporting an AMF. The RAN node may additionally perform slice selection for a UE. The CN node may additionally perform registration area management for the UE.

Figure 9:
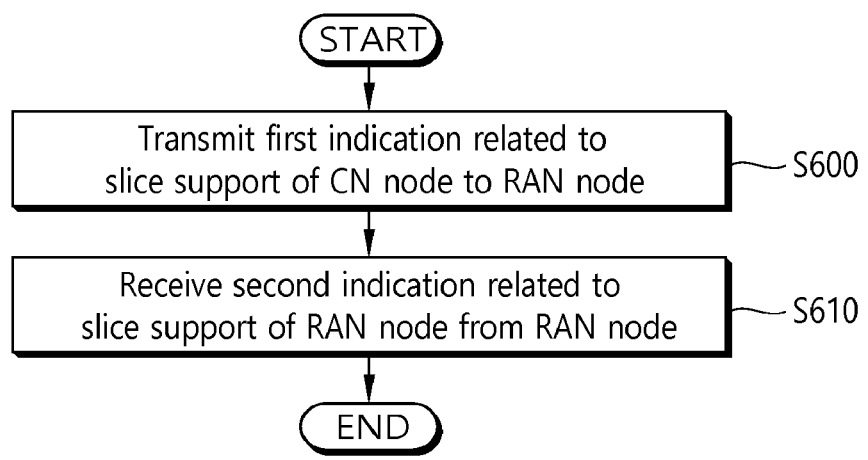
FIG. 9 shows a method for a CN node to perform a RAN-CN interface configuration update procedure according to an embodiment of the present invention.

FIG. 9 shows a method for a CN node to perform a RAN-CN interface configuration update procedure according to an embodiment of the present invention. This embodiment may correspond to the embodiment shown in FIG. 6 and/or FIG. 7.

At step S600, the CN node transmits a first indication related to slice support of the CN node to a RAN node. The first indication may be transmitted through an AMF/NG-RAN configuration update message.

At step S610, the CN node receives a second indication related to slice support of the RAN node from the RAN node. The second indication may be received through a gNB/NG-RAN configuration update message. The gNB/NG-RAN configuration update message may include a global a gNB ID or ng-eNB ID.

Figure 10:
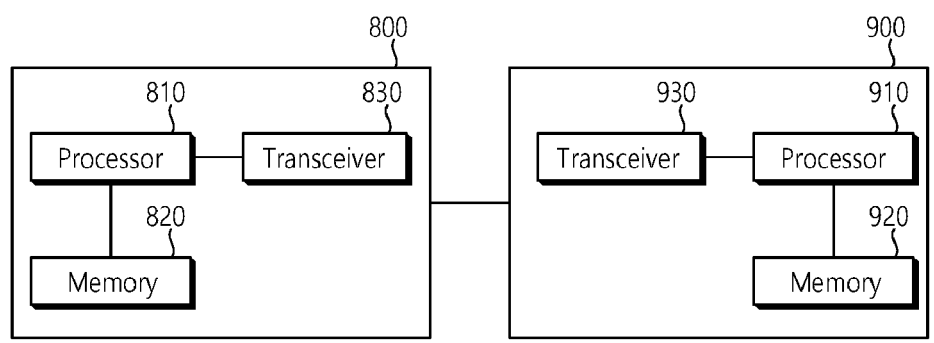
FIG. 10 shows a communication system to implement an embodiment of the present invention.

FIG. 10 shows a communication system to implement an embodiment of the present invention.

A RAN node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A CN node 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a radio access network (RAN) node in a wireless communication system, the method comprising:
    receiving, from a core network (CN) node, a CN node configuration update message including 1) identification information for the CN node, and 2) information related to slice support for the CN node including a "Service Type";
    transmitting, to the CN node, a CN node configuration update response message in response to the CN node configuration update message; and
    updating a configuration of a RAN-CN interface between the RAN node and the CN node based on the CN node configuration update message and the CN node configuration update response message.

2. The method of claim 1, wherein the RAN node is a gNB or an ng-eNB.

3. The method of claim 1, wherein the CN node is a node supporting a default or dedicated common control plane function (C-CPF) or a node supporting access and mobility management function (AMF).

4. The method of claim 1, wherein the information related to the slice support includes at least one of a "user equipment (UE) Usage Type", a "dedicated core network ID (DCN-ID)", a "domain network name (DNN)", a "multidimensional descriptor (MDD)", a "Tenant ID" or a "Service Descriptor/Slice type".

5. The method of claim 1, further comprising:
    performing slice selection for a user equipment (UE).

6. A radio access network (RAN) node in a wireless communication system, the RAN node comprising:
    at least one transceiver;
    at least processor; and
    at least one computer memory operably connectable to the at least one processor and storing instructions that, based on being executed by the at least one processor, perform operations comprising:
        receiving, from a core network (CN) node, a CN node configuration update message including 1) identification information for the CN node, and 2) information related to slice support for the CN node including a "Service Type";
        transmitting, to the CN node, a CN node configuration update response message in response to the CN node configuration update message; and
        updating a configuration of a RAN-CN interface between the RAN node and the CN node based on the CN node configuration update message and the CN node configuration update response message.

7. The RAN node of claim 6, wherein the RAN node is a gNB or an ng-eNB.

8. The RAN node of claim 6, wherein the CN node is a node supporting a default or dedicated common control plane function (C-CPF) or a node supporting access and mobility management function (AMF).

9. The RAN node of claim 6, wherein the information related to the slice support includes at least one of a "user equipment (UE) Usage Type", a "dedicated core network ID (DCN-ID)", a "domain network name (DNN)", a "multidimensional descriptor (MDD)", a "Tenant ID" or a "Service Descriptor/Slice type".

10. The RAN node of claim 6, wherein the operations further include performing slice selection for a user equipment (UE).

11. A radio access network (RAN) node in a wireless communication system, the RAN node comprising:
    at least one processor;
    at least one computer memory coupled to the at least one processor,
    wherein the at least one processor is configured to:
        obtain a core network (CN) node configuration update message including 1) identification information for the CN node, and 2) information related to slice support fora CN node including a "Service Type";
        generate a CN node configuration update response message in response to the CN node configuration update message; and
        update a configuration of a RAN-CN interface between the RAN node and the CN node based on the CN node configuration update message and the CN node configuration update response message.

12. The RAN node of claim 11, wherein the RAN node is a gNB or an ng-eNB.

13. The RAN node of claim 11, wherein the CN node is a node supporting a default or dedicated common control plane function (C-CPF) or a node supporting access and mobility management function (AMF).

14. The RAN node of claim 11, wherein the information related to the slice support includes at least one of a "user equipment (UE) Usage Type", a "dedicated core network ID (DCN-ID)", a "domain network name (DNN)", a "multidimensional descriptor (MDD)", a "Tenant ID" or a "Service Descriptor/Slice type".

15. The RAN node of claim 11, wherein the at least one processor is further configured to perform slice selection for a user equipment (UE).

* * * * *